United States Patent [19]

Tanaka et al.

[11] Patent Number: 4,625,992

[45] Date of Patent: Dec. 2, 1986

[54] VEHICLE SUSPENSION APPARATUS

[75] Inventors: Tadao Tanaka, Okazaki; Sunao Chikamori, Nagoya; Mitsuhiko Harara; Shinichi Takeuchi, both of Okazaki; Yasutaka Taniguchi; Masanaga Suzumura, both of Nagoya; Minoru Tatemoto, Okazaki; Naotake Kumagai, Aichi; Hiroki Abe, Okazaki, all of Japan

[73] Assignee: Mitsubishi Jidosha Kogyo Kabushiki Kaisha, Tokyo, Japan

[21] Appl. No.: 694,674

[22] Filed: Jan. 24, 1985

[30] Foreign Application Priority Data

| Jan. 24, 1984 | [JP] | Japan | 59-7202[U] |
| Apr. 25, 1984 | [JP] | Japan | 59-60913[U] |
| Apr. 25, 1984 | [JP] | Japan | 59-60915[U] |
| Apr. 28, 1984 | [JP] | Japan | 59-63112 |

[51] Int. Cl.$^4$ .............................................. B60G 3/00
[52] U.S. Cl. ..................................... 280/703; 280/707
[58] Field of Search ............ 280/707, 6 R, 6 H, 703; 267/65 D, 64.28

[56] References Cited

U.S. PATENT DOCUMENTS

| 3,277,975 | 10/1966 | Winsen | 280/703 |
| 4,185,845 | 1/1980 | Misch et al. | 280/707 |
| 4,368,900 | 1/1983 | Beusse | 280/707 |
| 4,506,751 | 3/1985 | Stephens | 280/703 |
| 4,573,702 | 3/1986 | Klem | 280/703 |

FOREIGN PATENT DOCUMENTS

| 5326021 | 8/1976 | Japan . |
| 2068308 | 8/1981 | United Kingdom . |

*Primary Examiner*—Richard A. Bertsch
*Attorney, Agent, or Firm*—Birch, Stewart, Kolasch & Birch

[57] ABSTRACT

A suspension apparatus has suspension units which have individual fluid spring chambers and are arranged on the wheels. When a detected negative acceleration (deceleration) exceeds a reference negative deceleration, front wheel fluid supply valves are opened for a control time T to supply a predetermined amount of fluid to the front wheel spring chambers and rear wheel fluid extent valves are opened for the control time T to exhaust a predetermined amount of fluid from the rear wheel fluid spring chambers, thereby decreasing nose dive at the time of deceleration.

10 Claims, 24 Drawing Figures

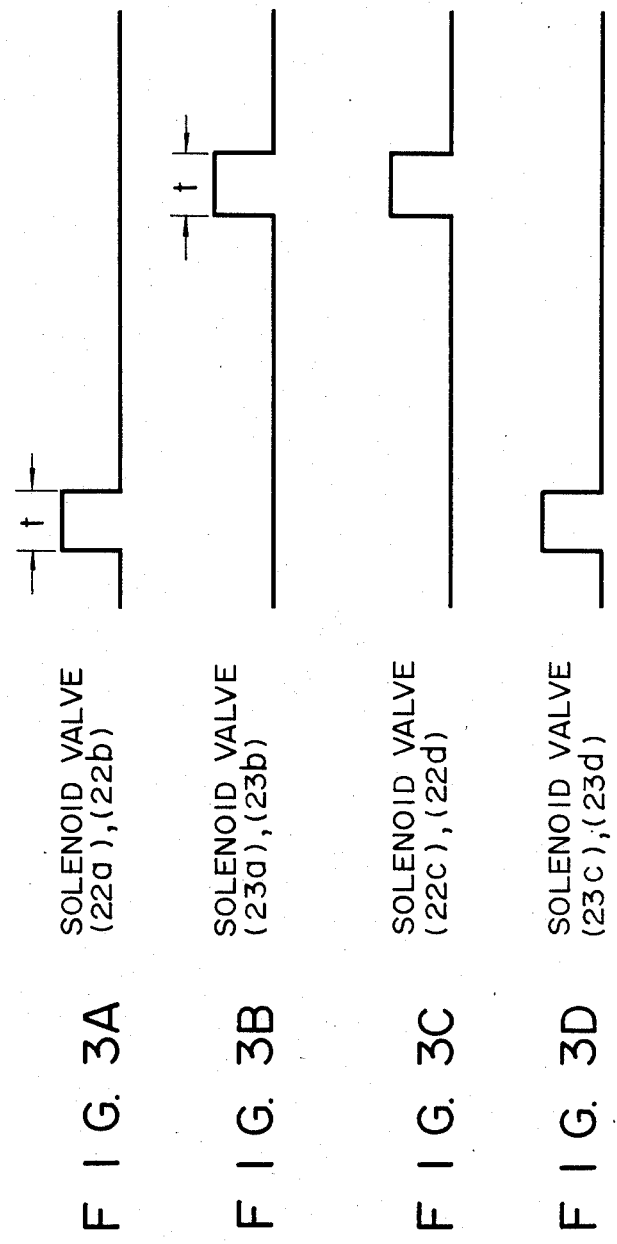

F I G. 12
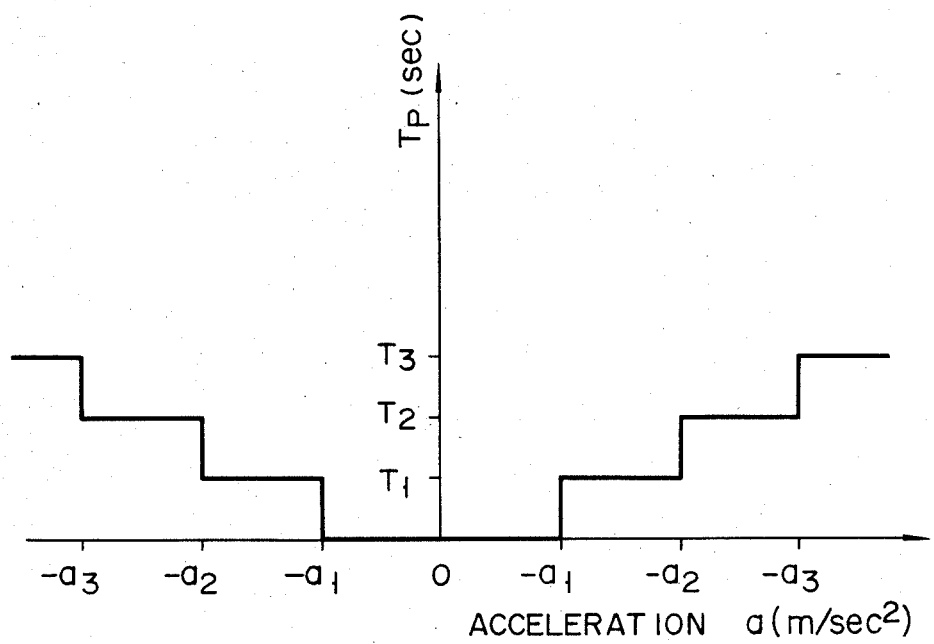

VEHICLE SUSPENSION APPARATUS

BACKGROUND OF THE INVENTION

The present invention relates to a vehicle suspension apparatus for preventing a nose dive, which is the descension of the front portion of a vehicle body when the driver depresses the brake pedal.

A conventional suspension apparatus is proposed wherein the damping force of a shock absorber mounted in a suspension unit for each wheel and the spring force of an air spring chamber therein are controlled to improve driving comfort and stability. However, to improve driving comfort, demand has arisen for more effective nose dive prevention.

SUMMARY OF THE INVENTION

It is an object of the present invention to provide a suspension apparatus for preventing a nose dive, which is the descension of the front portion of a vehicle body when the driver depresses the brake pedal.

In order to achieve the above object of the present invention, there is provided a suspension apparatus having: suspension units mounted on respective wheels and having fluid spring chambers; fluid supply means for supplying a fluid to the fluid spring chambers of the suspension units through control valves; and fluid exhaust means for exhausting the fluid from the fluid spring chambers through exhaust valves characterized by comprising:

acceleration detecting means for detecting acceleration acting on a vehicle body in the longitudinal direction thereof; and nose dive preventing means, for preventing a nose dive, in which front wheel fluid supply solenoid valves are opened for a control time T to supply the fluid to corresponding fluid spring chambers and rear wheel fluid exhaust solenoid valves are opened for the control time T to exhaust the fluid from corresponding fluid spring chambers when a negative acceleration detected by the acceleration detecting means exceeds a reference negative acceleration.

BRIEF DESCRIPTION OF THE DRAWINGS

FIGS. 3A to 3D are timing charts for explaining the opening/closing operation of solenoid valves;

FIG. 12 is a graph representing an $a$-$T_p$ map.

DETAILED DESCRIPTION OF THE PREFERRED EMBODIMENTS

Figure 1:
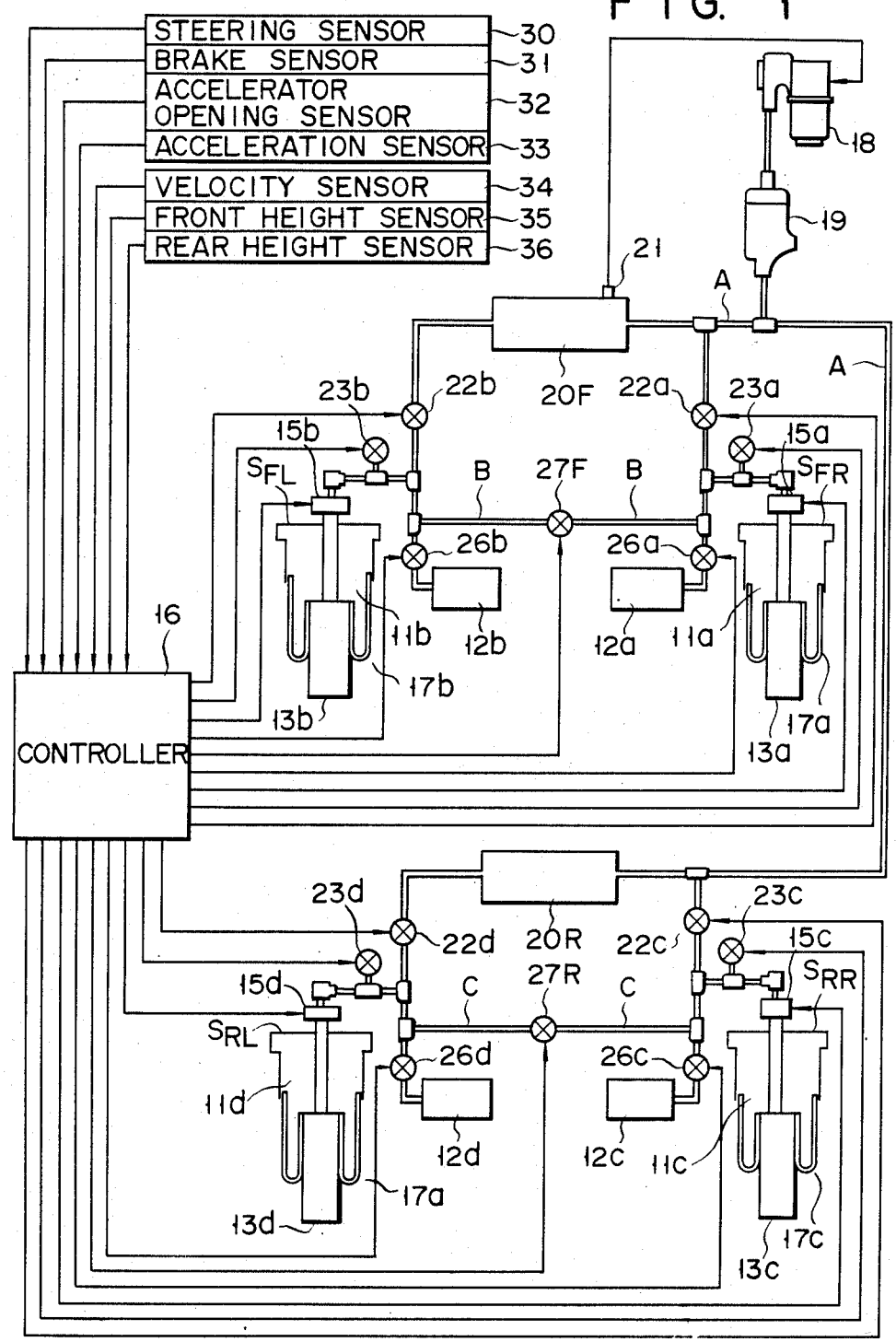
FIG. 1 is a diagram showing the overall construction of a vehicle suspension apparatus according to an embodiment of the present invention.

According to the present invention, an electronically controlled suspension apparatus will be described with reference to the accompanying drawings. Referring to FIG. 1, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ comprise main air spring chambers 11a to 11d, sub air spring chambers 12a to 12d, shock absorbers 13a to 13d, and coil springs (not shown) serving as auxiliary springs. Reference numerals 15a to 15d denote switches for increasing or decreasing the damping forces of the shock absorbers 13a to 13d. The switches 15a to 15d are controlled by a controller 16. Reference numerals 17a to 17d denote bellows.

Reference numeral 18 denotes a compressor for compressing atmospheric air supplied from an air cleaner (not shown) and supplying compressed air to a drier 19. The drier 19 dries compressed air by using silica gel or the like. The dried compressed air from the drier 19 is stored in a front wheel reserve tank 20F and a rear wheel reserve tank 20R through piping A. Reference numeral 21 denotes a pressure sensor arranged in the reserve tank 20F. When an internal pressure in the reserve tank 20F is decreased below a predetermined value, the pressure sensor 21 generates a signal. The compressor 18 is activated in response to this signal. When the internal pressure of the reserve tank 20F exceeds the predetermined value, the compressor 18 is stopped in response to the signal from the pressure sensor 21.

The reserve tank 20F is coupled to the main air spring chamber 11a through an inlet solenoid valve 22a. Similarly, the reserve tank 20R is coupled to the main air spring chamber 11b through an inlet solenoid valve 22b. Furthermore, the reserve tank 20R is connected to the main air spring chamber 11c through an inlet solenoid valve 22c. Further, the reserve tank 20R is coupled to the main air spring chamber 11d through an inlet solenoid valve 22d. It should be noted that the solenoid valves 22a to 22d comprise normally closed valves.

The compressed air is exhausted to the atmosphere from the main air spring chambers 11a to 11d through corresponding exhaust solenoid valves 23a to 23d and then through an exhaust pipe (not shown). It should be noted that the solenoid valves 23a to 23d comprise normally closed valves.

The main air spring chamber 11a is coupled to the sub air spring chamber 12a through a spring constant adjusting solenoid valve 26a. The main air spring chambers 11b, 11c and 11d are coupled to the sub air spring chambers 12b, 12c and 12d through spring constant adjusting solenoid valves 26b, 26c and 26d.

The main air spring chambers 11a and 11b are coupled to each other through a communicating pipe B and a communicating solenoid valve 27F. The air spring chambers 11c and 11d are coupled to each other through a communicating pipe C and a communicating solenoid valve 27R. It should be noted that the solenoid valves 27F and 27R comprise normally open valves.

The solenoid valves 22a to 22d, 23a to 23d, 26a to 26d, 27F and 27R are controlled in response to control signals from the controller 16.

Reference numeral 30 denotes a steering sensor for detecting the steering wheel angle; 31, a brake sensor for detecting the ON/OFF state of the brake unit; 32, an accelerator opening sensor for detecting the throttle valve opening; 33, an acceleration sensor for detecting acceleration along the horizontal and vertical directions; 34, a velocity sensor for detecting the vehicle velocity; 35, a front height sensor for detecting the height at the front portion (front wheel portion) of the vehicle; and 36, a rear height sensor for detecting the height at the rear portion (rear wheel portion) of the vehicle. Signals from the sensors 30 to 36 are supplied to the controller 16.

Figure 2A:
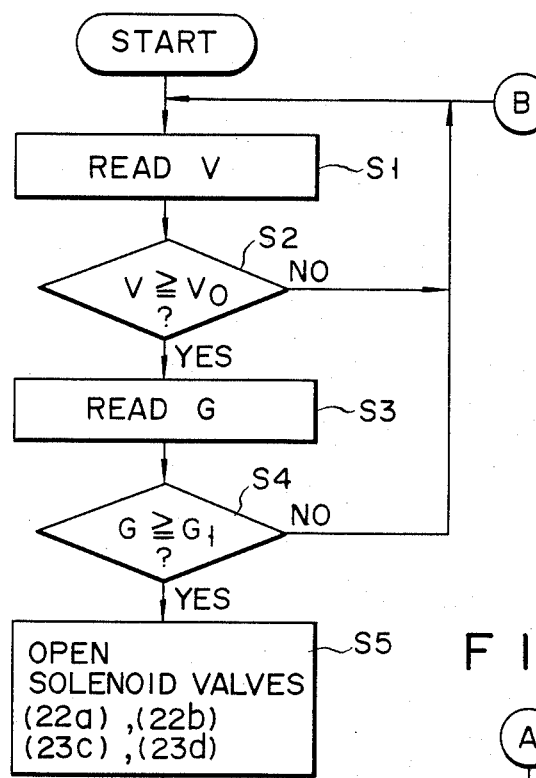
FIGS. 2A and 2B are flow charts for explaining the operation of a first embodiment of the present invention.
Figure 2B:
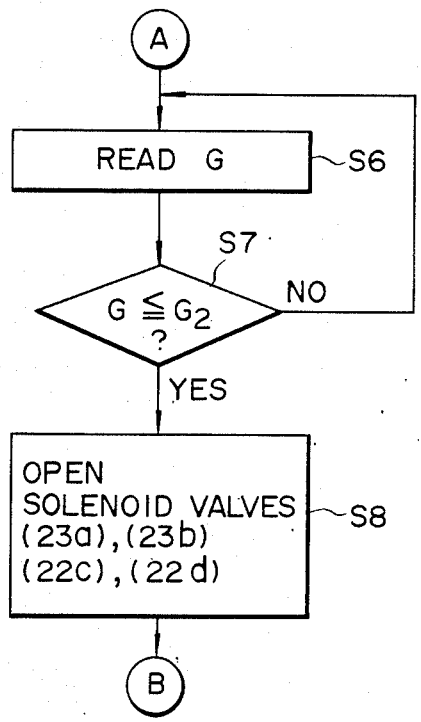

A first embodiment of the present invention will be described with reference to flow charts of FIGS. 2A and 2B. In step S1, a velocity V detected by the velocity sensor 34 is fetched by the controller 16. The controller 16 checks in step S2 whether or not the velocity V is equal to or larger than a reference velocity V0. If NO in step S2, the flow returns to step S1. However, if YES in step S2, the flow advances to step S3. A negative acceleration or deceleration G detected by the acceleration sensor 33 in the longitudinal direction of the vehicle body is fetched by the controller 16. This acceleration G represents actually a negative acceleration. The controller 16 checks in step S4 whether or not the detected negative acceleration G is equal to or larger than a reference negative acceleration G1. If NO in step S4, the flow returns to step S1. However, if YES in step S4, the flow advances to step S5. The front wheel solenoid valves 22a and 22b are opened for a period of time t to supply the compressed air to the main air spring chambers 11a and 11b, as shown in FIG. 3A, so that the shock absorbers 18a and 13b are biased to increase the vehicle height. At the same time, as shown in FIG. 3D, the rear wheel solenoid valves 23c and 23d are opened for the period of time t to exhaust the compressed air from the main air spring chambers 11c and 11d, thereby the shock absorbers 13c and 13d are biased to decrease the vehicle height. Since the front shock absorbers are biased to increase the front height and the rear shock absorbers are biased to decrease the rear height, the falling of the front portion of the vehicle body is minimized.

When vehicle position control in step S5 is completed, the flow advances to step S6. A negative acceleration G detected by the acceleration sensor 33 is fetched by the controller 16. The flow advances to step S7. The controller 16 then checks whether or not the detected negative acceleration G is equal to or smaller than another reference negative acceleration G2. It should be noted that G2 is smaller than G1. If NO in step S7, the flow returns to step S6. However, if YES in step S7, the flow advances to step S8, and the solenoid valves 23a and 23b are opened for the period of time t to exhaust the compressed air from the main air spring chambers 11a and 11b, as shown in FIG. 3B. The front shock absorbers 13a and 13b are biased to decrease the front height. At the same time, as shown in FIG. 3C, the solenoid valves 22c and 22d are opened for the period of time t to supply the compressed air to the main air spring chambers 11c and 11d, the rear shock absorbers are biased to increase the rear height. In this manner, when the negative acceleration becomes lower than the reference negative acceleration G2 and the front portion of the vehicle tends to rise, the front shock absorbers are biased to decrease the front height and the rear shock absorbers are biased to increase the rear height so as to cancel vehicle position control. Thereafter, the flow returns to step S1.

Consequently, when the negative acceleration exceeds the reference negative acceleration G1, the front shock absorbers are biased to increase the front height and the rear shock absorbers are biased to decrease the rear height. Even if the brake pedal is abruptly depressed, the nose dive is compensated to prevent driving discomfort.

Figure 4:
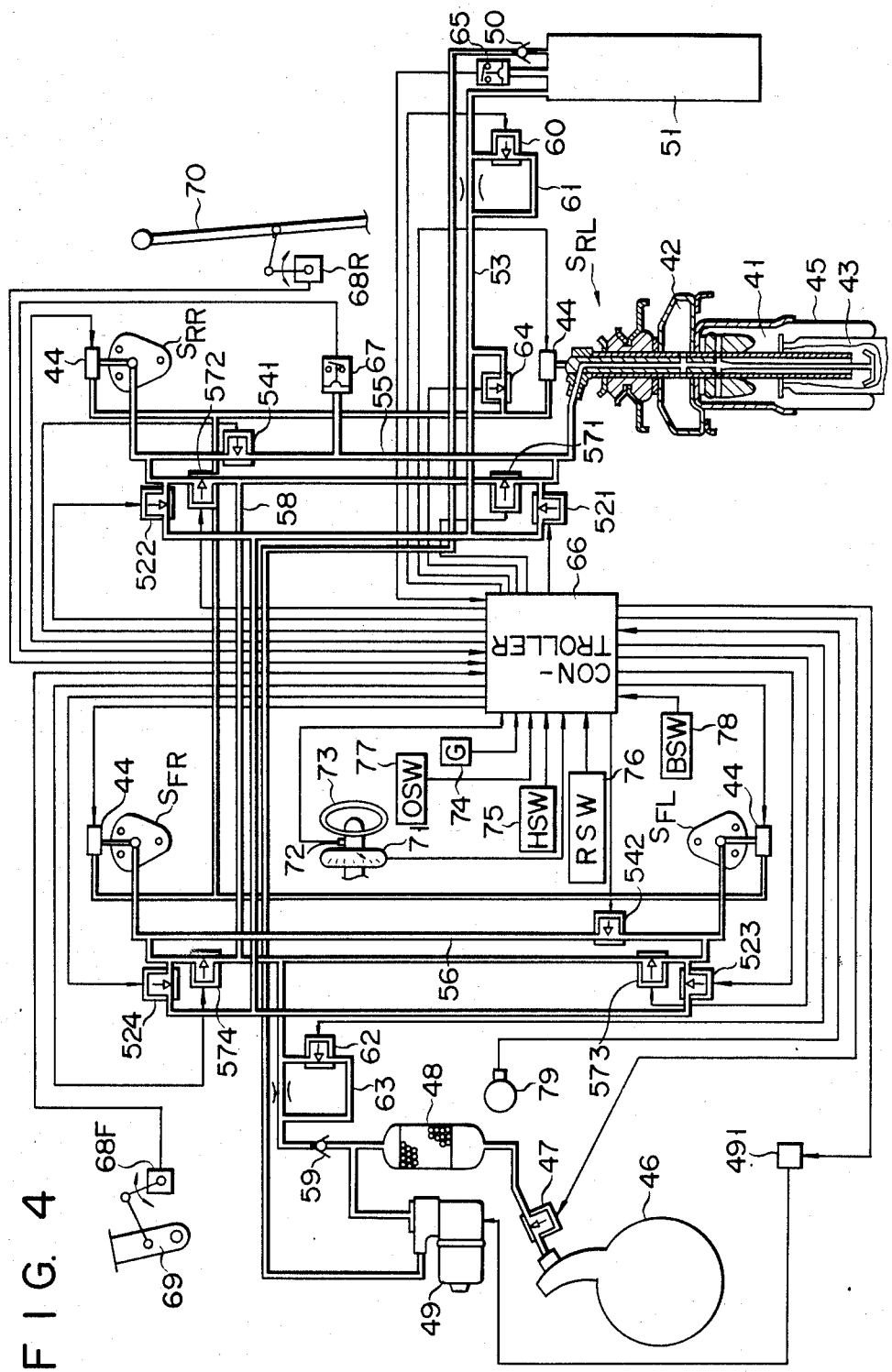
FIG. 4 is a diagram showing a modification of the vehicle suspension apparatus according to the present invention.

FIG. 4 shows a modification of the vehicle suspension apparatus according to the present invention. Referring to FIG. 4, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RL}$ and $S_{RR}$ have an identical structure, and only the construction of the suspension unit $S_{RL}$ is illustrated. The suspension unit $S_{RL}$ comprises a main air spring chamber 41, a sub air suspension chamber 42, a shock absorber 43, and a coil spring (not shown) used as an auxiliary spring. Reference numeral 44 denotes an actuator for increasing/decreasing the attenuation force of the shock absorber 43; and 45, a bellows. The actuator 44 controls communication between the main air spring chamber 41 and the sub air spring chamber 42 so as to increase/decrease an air spring constant.

Reference numeral 46 denotes an air cleaner. Atmospheric air from the air cleaner 46 is supplied to a drier 48 through a sealing solenoid valve 47. The dried air from the drier 48 is compressed by a compressor 49. The compressed air is then stored in a reserve tank 51 through a check valve 40. Reference numeral 491 denotes a compressor relay which is controlled in response to a signal from a controller 66 to be described later. The reserve tank 51 is connected to the main and sub air spring chambers 41 and 42 of the suspension units $S_{RL}$ to $S_{FL}$ through piping 53 having inlet solenoid valves 521 to 524.

The main and sub air spring chambers 41 and 42 of the suspension units $S_{RL}$ and $S_{RR}$ are coupled to each other through a communicating pipe 55 having a communicating solenoid valve 541. The main and sub air spring chambers 41 and 42 of the suspension units $S_{FL}$ and $S_{FR}$ are coupled to each other through a communicating pipe 56 having a communicating solenoid valve 542. Furthermore, the main and sub air spring chambers 41 and 42 of the suspension $S_{RL}$ to $S_{FL}$ are evacuated through an exhaust pipe 58 having exhaust solenoid valves 571 to 574, a check valve 59, the drier 48, the solenoid valve 47 and the air cleaner 46. The pipe 53 is arranged parallel to a pipe 61 having a supply path selection solenoid valve 60. A pipe 63 having an exhaust path selection solenoid valve 62 is arranged parallel to the pipe 58. The pipe 53 and the actuator 44 are coupled through a force increasing/decreasing switching solenoid valve 64.

The pressure of the compressed air stored in the reserve tank 51 is detected by a pressure switch 65. A detection signal from the pressure switch 65 is supplied to the controller 66. Reference numeral 67 denotes a pressure switch coupled to the communicating pipe 55 to detect internal pressures of the main and sub air spring chambers 41 and 42 of the rear wheel suspension units $S_{RR}$ and $S_{RL}$. A detection signal from the pressure switch 67 is supplied to the controller 66.

Reference numeral 68F denotes a front height sensor mounted on a right front lower arm 69 of the vehicle suspension to detect a front portion height (front height). Reference numeral 68R denotes a rear height sensor mounted on a left rear lateral rod 70 of the vehicle suspension to detect a rear portion height (rear height). Height detection signals from the height sensors 68F and 68R are supplied to the controller 66. Each of the sensors 68F and 68R comprises a set of a Hall IC element and a magnet. Either the Hall IC element or the magnet is mounted on a wheel side, while the other is mounted on a vehicle body side so as to detect distances from a normal vehicle height and a low or high vehicle height. Reference numeral 71 denotes a velocity sensor for detecting the vehicle velocity. A detection signal from the velocity sensor 71 is supplied to the controller 66. Reference numeral 72 denotes a steering angle sensor for detecting the rotational angle of a steering wheel 73. The steering angle or handle angle detection signal from the sensor 72 is supplied to the controller 66.

Reference numeral 74 denotes a vehicle posture sensor as an acceleration (G) sensor for detecting a change in vehicle body position. This acceleration sensor 74 detects changes in pitch, roll and yaw of the vehicle body on the vehicle springs. For example, when no negative acceleration is generated, a weight lifted, and light from a light-emitting diode is shielded by a shielding plate coupled to the weight, so that light from the light-emitting diode does not reach a photodiode. In this manner, the absence of negative acceleration is detected. However, when a negative acceleration acts on the vehicle body, the weight is inclined or moved allowing light from the light-emitting diode to reach the photodiode, thereby detecting a negative acceleration state of the vehicle body. When light from the light-emitting diode reaches the photodiode, the acceleration sensor 74 is turned on.

Reference numeral 75 denotes a height selection switch (HSW) for selecting a HIGH, LOW or AUTO height mode. Reference numeral 76 denotes a position control selection switch (RSW) for designating that position control is performed to prevent rolling of the vehicle. Signals from the switches 75 and 76 are supplied to the controller 66.

Reference numeral 77 denotes an oil switch (OSW) for detecting that of engine oil pressure has reached a predetermined value. An oil pressure detection signal from the oil pressure switch 77 is supplied to the controller 66. Reference numeral 78 denotes a brake switch which is turned on when the driver depresses the brake pedal. A detection signal from the brake switch 78 is supplied to the controller 66.

It should be noted that the solenoid valves 47, 521 to 524, 571 to 574, 60 and 64 comprise normally closed valves, and that the solenoid valves 541 and 542 comprise normally open valves, respectively.

Figure 5:
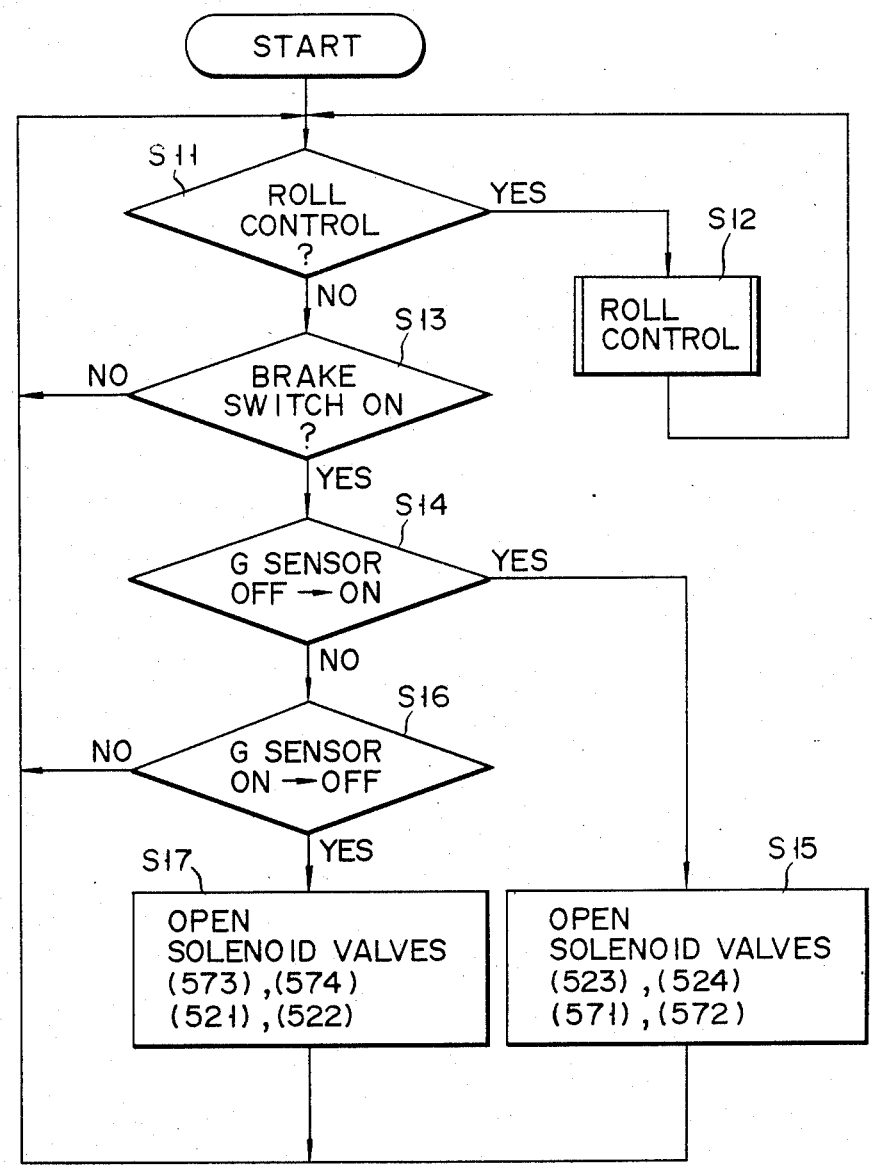
FIG. 5 is a flow chart for explaining the operation of a second embodiment of the present invention.

The operation of the modification having the construction described above will be described according to a second embodiment of the present invention. The controller 66 shown in FIG. 4 performs the operation in accordance with the flow chart of FIG. 5. The controller checks in step S11 whether or not roll control, i.e., roll prevention of the vehicle is required. When the lateral acceleration detected by the acceleration sensor 74 exceeds the predetermined value, the controller 66 determines that roll control is required. The flow advances to step S12. The compressed air is supplied to the main and sub air spring chambers 41 and 42 of either the pair of right suspension units $S_{FR}$ and $S_{RR}$ or the left suspension units $S_{FL}$ and $S_{RL}$. The compressed air is exhausted from the main and sub air spring chambers 41 and 42 of the other pair, thereby maintaining the vehicle body horizontal.

If NO in step S11, the flow advances to step S13. The controller 66 checks in step S13 whether or not the brake pedal is depressed in accordance with the signal from the brake switch 78. If YES in step S13, i.e., when the controller 66 detects that the brake pedal is depressed, the flow advances to step S14, and the acceleration sensor 74 is turned on. In other words, the controller 66 checks whether or not the detected negative acceleration exceeds the predetermined value.

When the driver depresses the brake pedal, the deceleration (negative acceleration) is increased. The negative acceleration increases as the braking force is increased, thereby decreasing the front height of the vehicle body and causing a so-called nose dive. If YES in step S14, the flow advances to step S15. In step S15, the solenoid valves 523 and 524, and 571 and 572 are opened for the predetermined period of time in response to the control signal from the controller 66. The front suspension units $S_{FL}$ and $S_{FR}$ are biased to increase the front height and the rear suspension units $S_{RL}$ and $S_{RR}$ are biased to decrease the rear height so as to horizontally maintain the vehicle body. Thereafter, the flow returns to step S11.

When the brake pedal is continuously depressed, step S13 is detected to be YES, and the flow advances to step S14 again. After the brake pedal is depressed to decrease the current velocity to a given value, the driver releases the brake pedal. As the brake pedal is released, the deceleration or negative acceleration decreases. In this state, step S14 is discriminated to be NO. Step S16 is also discriminated to be NO, i.e., the negative acceleration has decreased below the predetermined value. In step S17, the solenoid valves 573 and 574, and 521 and 522 are opened for a predetermined period of time, so that the front suspension units $S_{FL}$ and $S_{FR}$ are biased to decrease the front height and the rear suspension units $S_{RL}$ and $S_{RR}$ are biased to increase the rear height. As a result, the vehicle body is maintained horizontally. Thereafter, the flow returns to step S11.

When the driver slightly depresses the brake pedal, the deceleration is small. In this case, the operation in steps S14, S16, S11, S13 and S14 is repeated, and position control in steps S15 and S17 will not be performed.

Figure 6A:
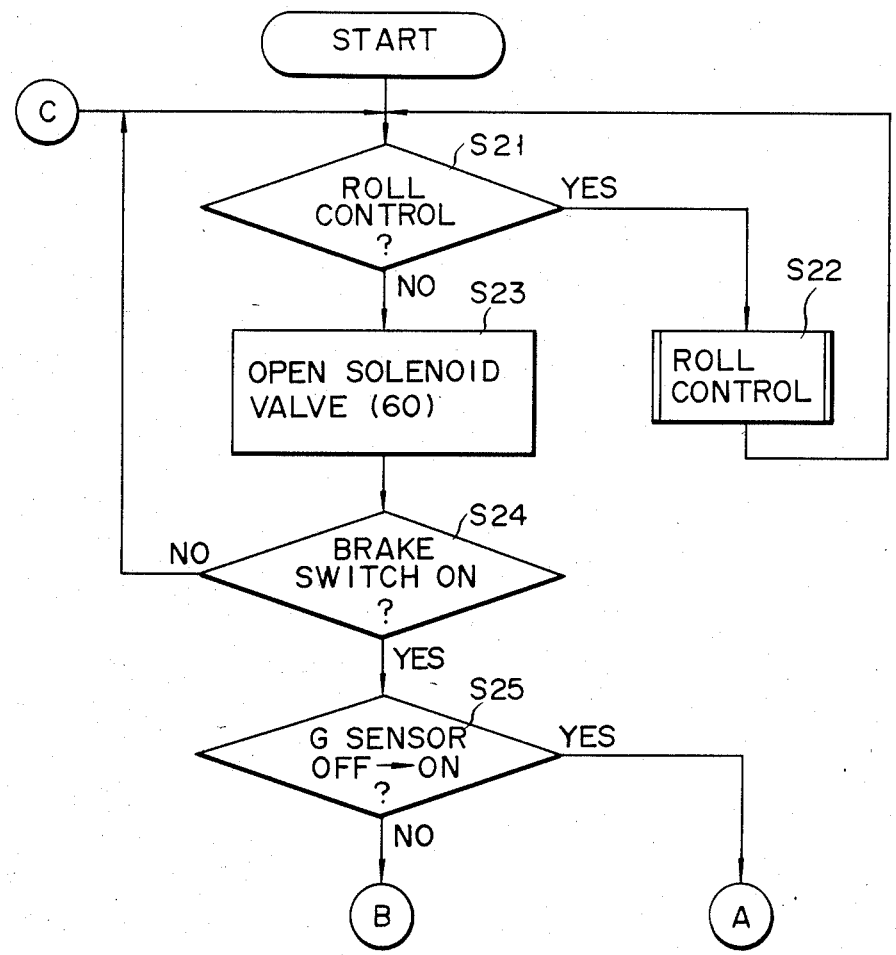
FIGS. 6A to 6C are flow charts for explaining the operation of a third embodiment of the present invention.
Figure 6B:
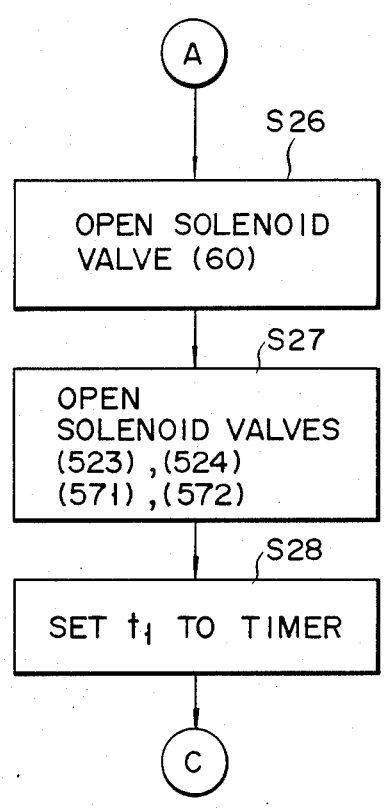
Figure 6C:
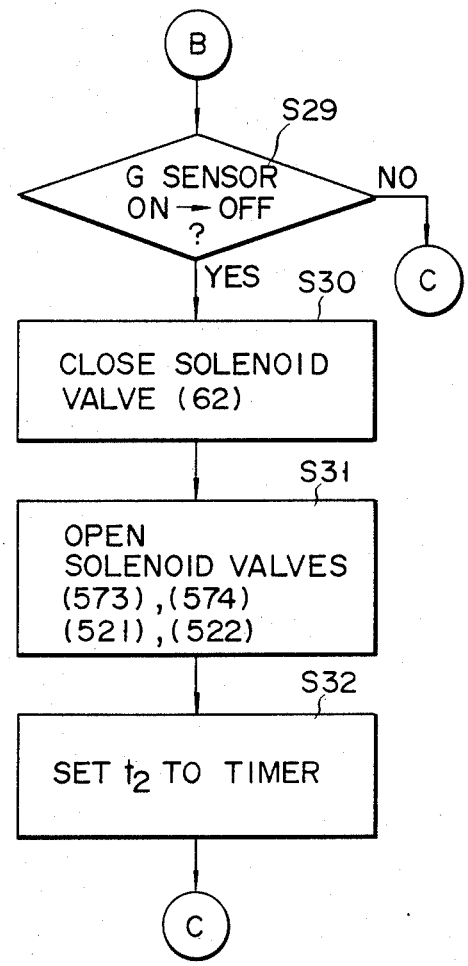

The operation of a third embodiment will be described hereinafter. The controller 66 shown in FIG. 4 performs the operation in accordance with a flow chart of FIGS. 6A to 6C. The controller 66 checks in step S21 whether or not roll control, i.e., reduction of rolling of the vehicle body is required. For example, when a lateral acceleration detected by the acceleration sensor 74 exceeds a predetermined value, roll control is required. In this case, the flow advances to step S22, and roll control is started. The compressed air is supplied to the main and sub air spring chambers 41 and 42 of either the pair of right suspension units $S_{FR}$ and $S_{RR}$ or the left suspension units $S_{FL}$ and $S_{RL}$. The compressed air is exhausted from the main and sub air spring chambers 41 and 42 of the other pair, thereby horizontally maintaining the vehicle body.

If NO in step S21, the flow advances to step S23. The controller checks in step S23 that the supply path selection solenoid valve 60 is opened. The controller 66 checks in step S24 whether or not the brake pedal is depressed in accordance with the signal from the brake switch 78. If YES in step S24, i.e., when the controller 66 detects that the brake pedal is depressed, the flow advances to step S25, and the acceleration sensor 74 is turned on. In other words, the controller 66 checks whether or not the detected negative acceleration exceeds the predetermined value.

When the driver depresses the brake pedal, a deceleration (negative acceleration) is increased. The negative acceleration increases as braking force is increased, thereby decreasing the front height of the vehicle body and causing a so-called nose dive. If YES in step S25, the flow advances to step S26.

In step S26, the controller 66 checks that the supply path selection solenoid valve 60 is opened. In step 27, the solenoid valves 523 and 524, and 571 and 572 are opened for a predetermined period of time in response to the control signal from the controller 66. The front suspension units $S_{FL}$ and $S_{FR}$ are biased to increase the front height, and the rear suspension units $S_{RL}$ and $S_{RR}$ are biased to decrease the rear height so as to horizontally maintain the vehicle body. In step S28, the time is delayed by a period of time t1, and then the flow returns to step S21.

When the brake pedal is continuously depressed, step S24 is detected to be YES, and the flow advances to step S25 again. After the brake pedal is depressed to decrease the current velocity to a given value, the driver releases the brake pedal. As the brake pedal is released, the deceleration or negative acceleration decreases. In this state, step S25 is discriminated to be NO. Step S29 is also discriminated to be NO, i.e., the negative acceleration is decreased below the predetermined value. In step S30, the controller 66 checks that the exhaust path selection solenoid 62 is closed. In step S31, the solenoid valves 573 and 574, and 521 and 522 are opened for a predetermined period of time in response to a control signal from the controller 66. The front suspension units $S_{FL}$ and $S_{FR}$ are biased to decrease the front height, and the rear suspension units $S_{RL}$ and $S_{RR}$ are biased to increase the rear height, thereby horizontally maintaining the vehicle body. The time is delayed by a period of time t2 by a timer in step S32, and the flow returns to step S21.

However, when the brake pedal is slightly depressed, the deceleration is small, so that the operation in steps S25, S29, S21, S23, S24 and S25 is repeated, and position control in steps S27 and S31 will not be performed.

According to this embodiment, nose dive occurring upon depression of the brake pedal is prevented because the solenoid valve 60 is opened to supply the compressed air to the corresponding air spring chambers, so that the amount of compressed air supplied thereto can be increased to quickly increase the front height. However, when the compressed air is exhausted, the solenoid valve 62 is closed, so that the amount of compressed air exhausted from the corresponding air chambers can be decreased. The front height is gradually increased to dampen the shock.

At this time, the time delay operations by t1 and t2 in steps S28 and 32 are performed. This is because front wheel side air exhaustion and rear wheel side air supply are not performed even if the negative acceleration is decreased within the period of time t1 after the front wheel side air supply and the rear wheel side air exhaustion are performed for the predetermined period of time upon prolonged depression of the brake pedal. Furthermore, when the negative acceleration is increased for a period of time t2 after the front wheel side air exhaustion and the rear wheel side air supply are performed, front wheel side air supply and rear wheel side air exhaustion are not performed.

The acceleration detected by the acceleration sensor 74 is referred to only when the brake pedal is depressed. For this reason, the acceleration sensor 74 is turned on when the acceleration exceeding the predetermined value is generated irrespective of the direction of acceleration. Even if the acceleration sensor 74 is turned on in accordance with a large increase in acceleration, anti nose-dive control can not be performed.

Figure 7A:
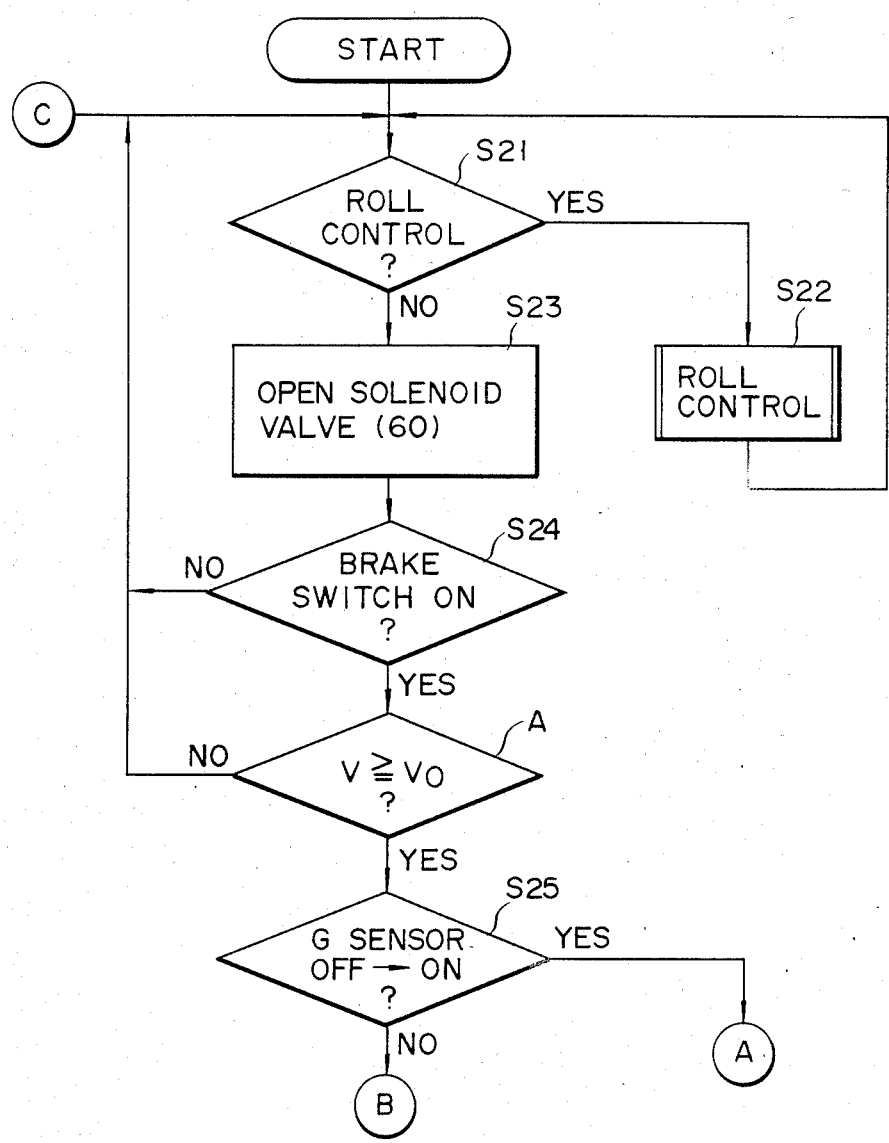
FIGS. 7A to 7C are flow charts for explaining the operation of a fourth embodiment of the present invention.
Figure 7B:
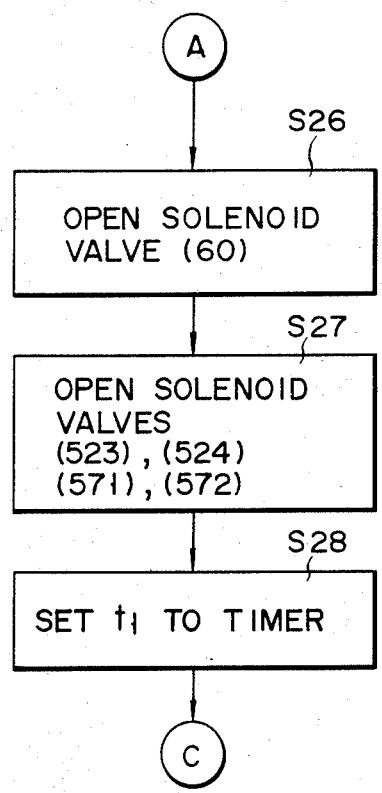
Figure 7C:
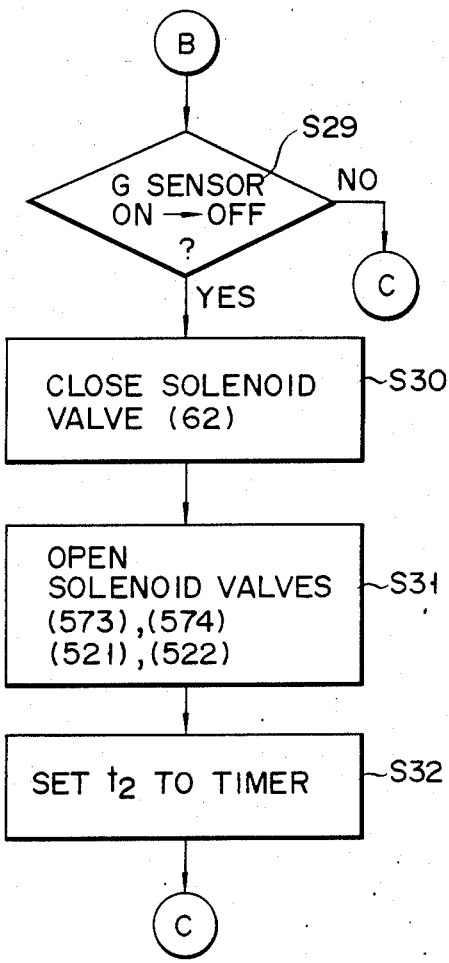

The operation of a fourth embodiment of the present invention will be described with reference to flow charts of FIGS. 7A to 7C. The flow charts of FIGS. 7A to 7C are obtained by inserting step A between steps S24 and S25 of the flow chart of FIG. 6. In step A, even if the brake pedal is depressed, step S25 is executed when the vehicle velocity V exceeds a reference value V0 (e.g., 3 km/h). Therefore, even if the driver depresses the brake pedal to stop on a slope, the anti nose-dive control will not be performed.

Figure 8:
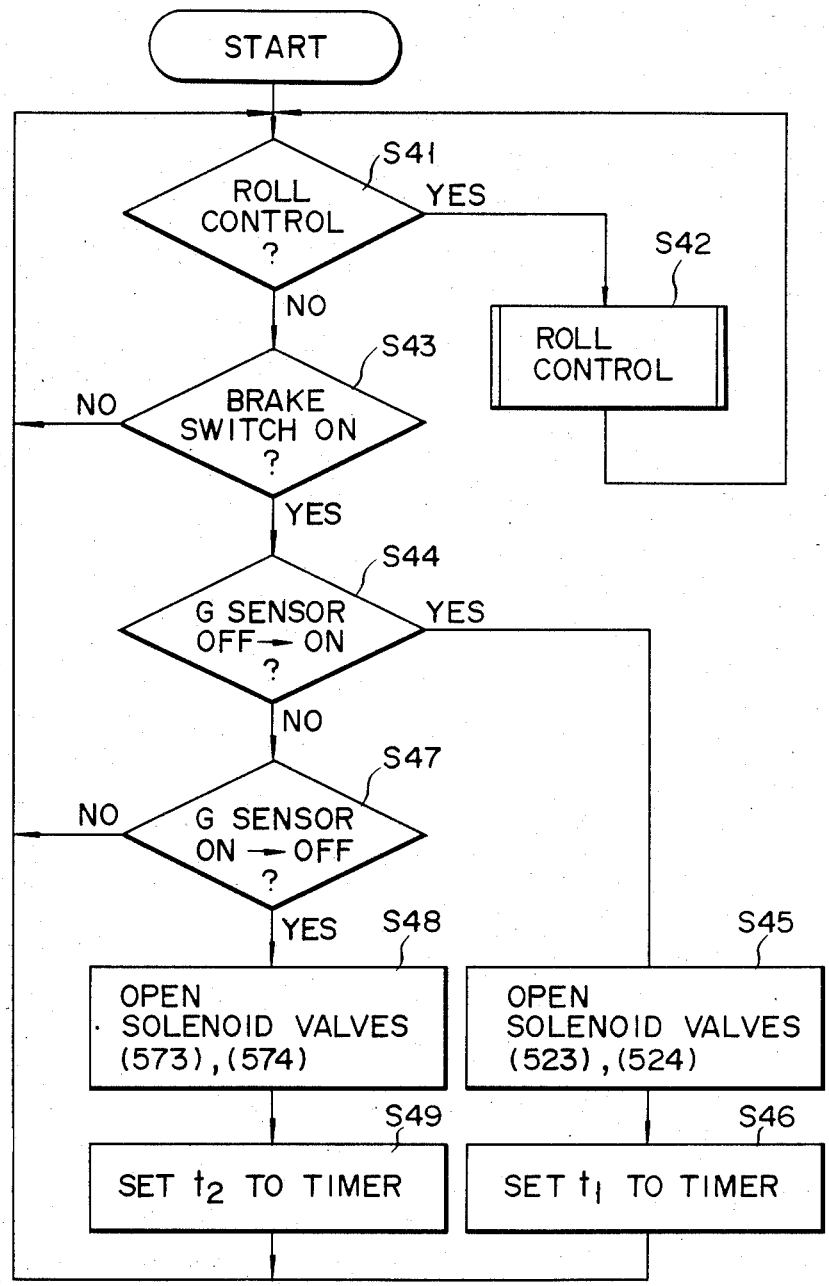
FIG. 8 is a flow chart for explaining the operation of a fifth embodiment of the present invention.

The operation of a fifth embodiment of the present invention will be described with reference to the flow chart of FIG. 8. The controller 66 checks in step S41 whether or not roll control, i.e., prevention of rolling of the vehicle body is required. For example, when a lateral acceleration detected by the acceleration sensor 74 exceeds a predetermined value, roll control is required.

In this case, the flow advances to step S42, and roll control is started. The compressed air is supplied to the main and sub air spring chambers 41 and 42 of either the pair of right suspension units $S_{FR}$ and $S_{RR}$ or left suspension units $S_{FL}$ and $S_{RL}$. The compressed air is exhausted from the main and sub air spring chambers 41 and 42 of the other pair, thereby horizontally maintaining the vehicle body. If NO in step S41, the flow advances to step S43. The controller checks in step S43 whether or not the brake pedal is depressed in accordance with the signal from the brake switch 78.

If YES in step S43, i.e., when the controller 66 detects that the brake pedal is depressed, the flow advances to step S44. The acceleration sensor 74 is turned on. In other words, the controller 66 checks whether or not the detected negative acceleration exceeds the predetermined value. When the driver depresses the brake pedal, a deceleration (negative acceleration) is increased. The negative acceleration increases when braking force is increased, thereby decreasing the front height of the vehicle body and causing a nose dive.

If YES in step S44, the flow advances to step S45. In step S45, the solenoid valves 523 and 524 are opened for a predetermined period of time in response to the control signal from the controller 66. The front suspension units $S_{FL}$ and $S_{FR}$ are biased to increase the front height so as to horizontally maintain the vehicle body. In step S46, the time is delayed by a period of time t1, and then the flow returns to step S41.

When the brake pedal is continuously depressed, step S43 is detected to be YES, and the flow advances to step S44 again. After the brake pedal is depressed to decrease the current velocity to a given value, the driver releases the brake pedal. As the brake pedal is released, the deceleration or negative acceleration is decreased. In this state, step S44 is discriminated to be NO. Step S47 is also discriminated to be NO, i.e., the negative acceleration is decreased below the predetermined value. In step S48, the solenoid valves 573 and 574 are opened for a predetermined period of time in response to a control signal from the controller 66. The front suspension units $S_{FL}$ and $S_{FR}$ are biased to decrease the front height, thereby horizontally maintaining the vehicle body. The time is delayed by the period of time t2 in step S49, and the flow returns to step S41.

However, when the brake pedal is slightly depressed, the deceleration is small, so that the operation in steps S44, S47, S41, S43, and S44 is repeated, and position control in steps S45 and S48 will not be performed.

The time delay operations by t1 and t2 in steps S46 and 49 are performed. This is because front wheel side air exhaustion will not be performed even if the negative acceleration is decreased within the period of time t1 after the front wheel side air supply is performed for the predetermined period of time upon prolonged depression of the brake pedal. Furthermore, when the negative acceleration is increased for the period of time t2 after the front wheel side air exhaustion is performed, the front wheel side air supply will not be performed.

In this manner, the front suspension units $S_{FL}$ and $S_{FR}$ are biased to increase the front height although the front portion of the vehicle body tends to descend due to deceleration, thereby horizontally maintaining the vehicle body. In this case, solenoid valves 523 and 524, and 573 and 574 are opened/closed, so that the control operation can be simplified.

Figure 9:
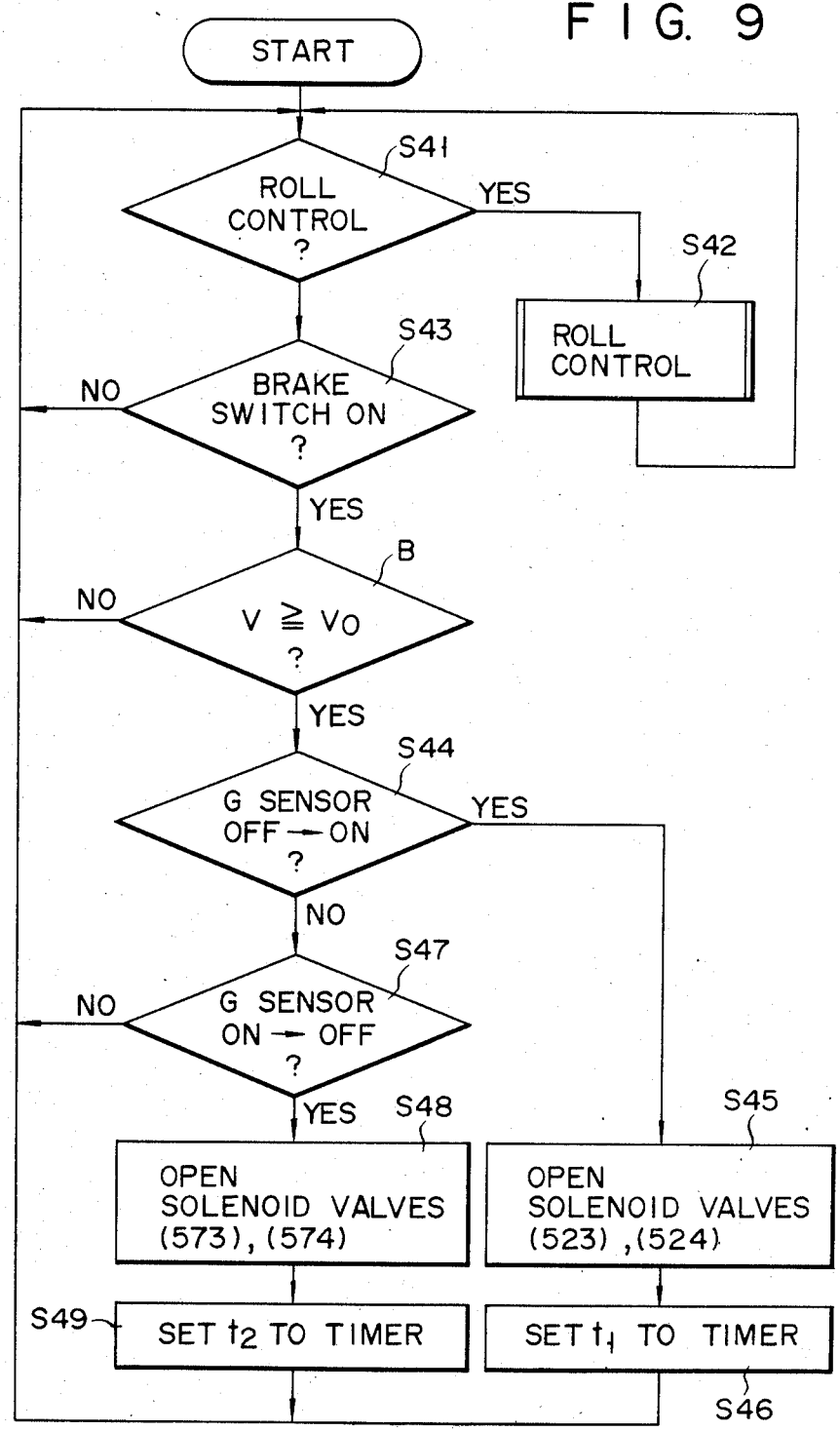
FIG. 9 is a flow chart for explaining the operation of a sixth embodiment of the present invention.

The operation of a sixth embodiment of the present invention will be described with reference to a flow chart of FIG. 9. The flow chart of FIG. 9 is obtained by inserting step B between steps S43 and S44 of the flow chart of FIG. 8. In step B, even if the brake pedal is depressed, step S44 is executed when the vehicle velocity V exceeds a reference value V0 (e.g., 3 km/h). Therefore, even if the driver depresses the brake pedal so as to stop on a slope, the anti nose-dive control will not be performed.

Figure 10A:
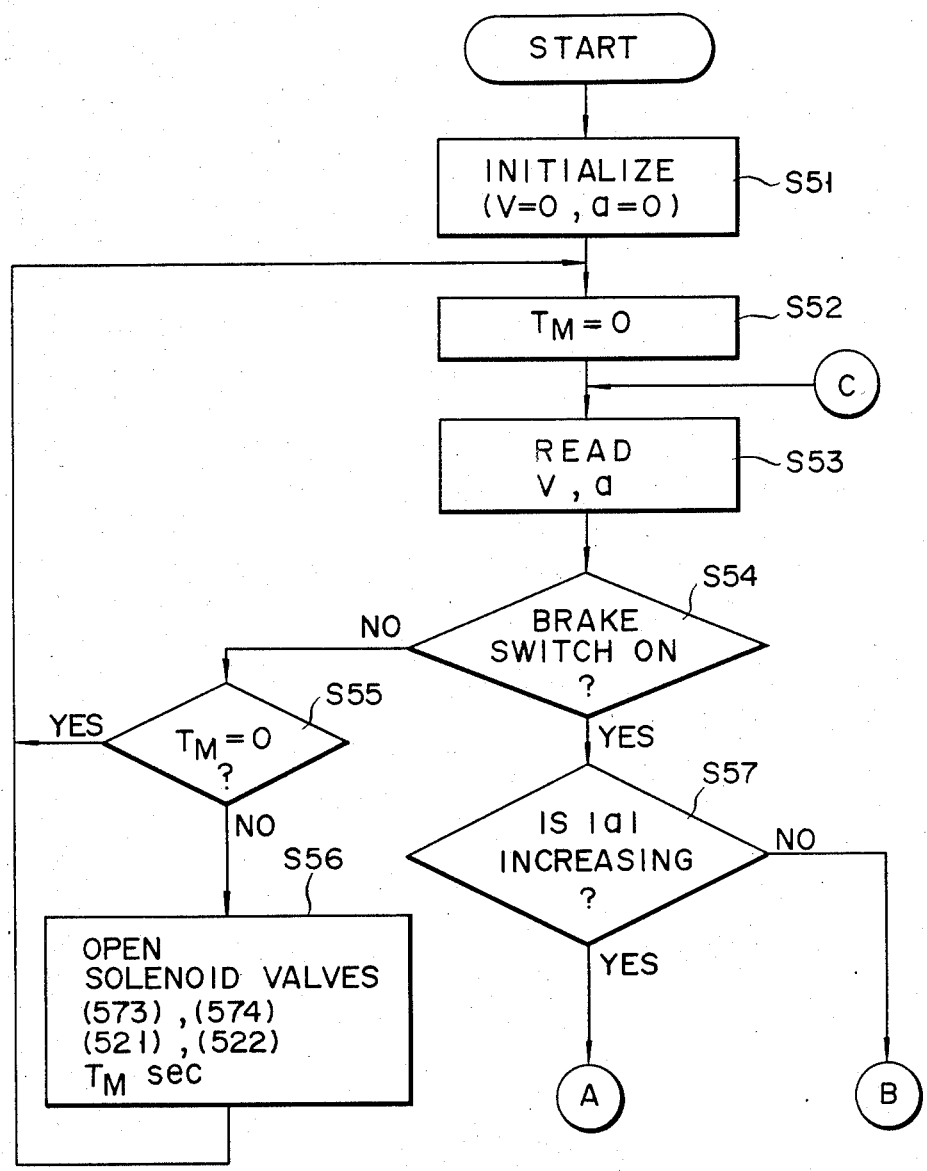
FIGS. 10A to 10C are flow charts for explaining the operation of a seventh embodiment of the present invention.
Figure 10B:
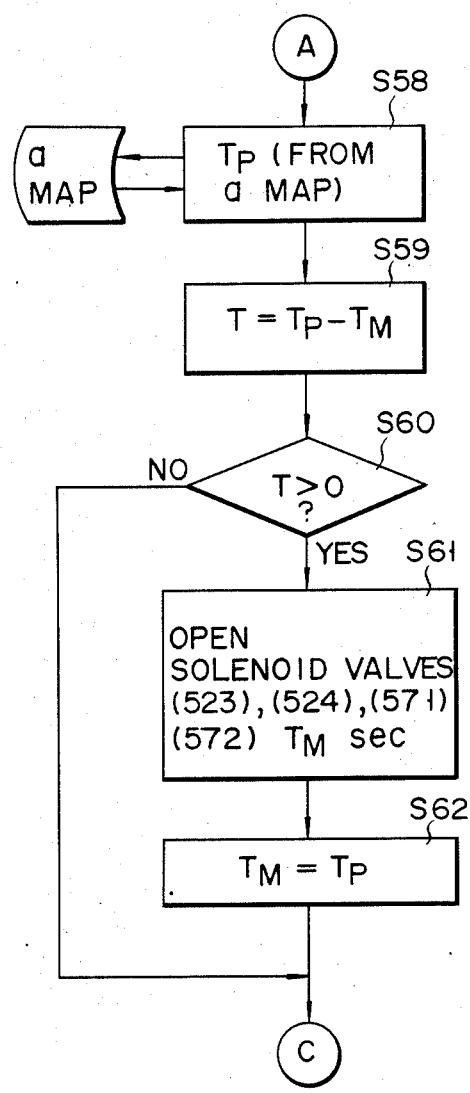
Figure 10C:
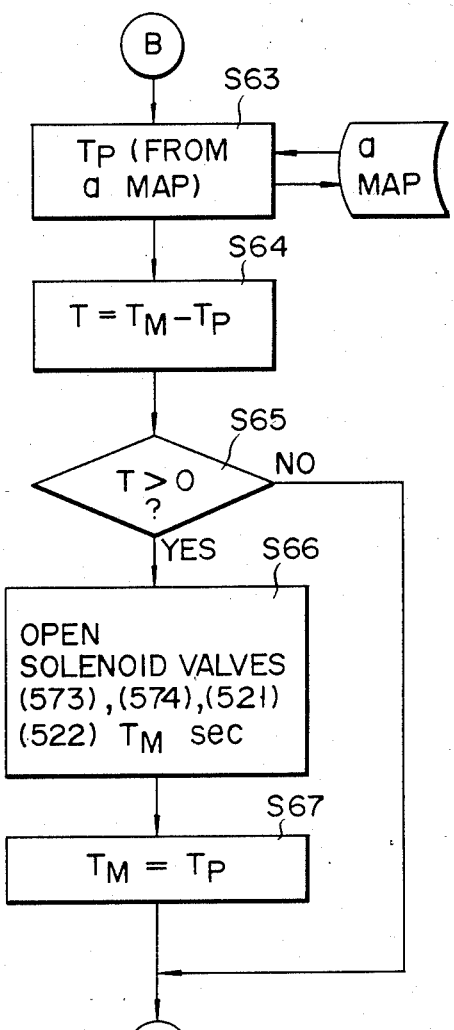

The operation of a seventh embodiment will be described with reference to flow charts of FIGS. 10A to 10C. When the driver turns on the ignition, the controller 66 performs the operation in accordance with the flow charts of FIGS. 10A to 10C. In step S51, a predetermined memory area of the controller 66 which stores a velocity V and an acceleration a is cleared. In step S52, a map memory $T_M$ is reset ($T_M=0$). In step S53, the velocity V detected by the velocity sensor 71 is fetched by the controller 66. The controller 66 also calculates a negative acceleration a, a change in velocity V as a function of time.

The controller 66 checks in step S54 whether or not the brake switch 78 is turned on, i.e., the brake pedal is depressed.

If YES in step S54, i.e., when the controller 66 discriminates that braking is performed, the flow advances to step S57. The controller 66 checks in step S57 whether or not an absolute value |a| of the negative acceleration a is increased. If YES in step S57, the flow advances to step S58. A control time $T_P$ is calculated in accordance with the acceleration map showing the acceleration a.

In step S59, a valve control time T ($=T_P-T_M$) is calculated.

The controller 66 then checks in step S60 whether or not the valve control time T is larger than 0. If NO in step S60, the flow returns to step S53. In this case, vehicle position control is not performed because it is determined that the deceleration is small. However, if YES in step S60, the flow advances to step S61. In step S61, the solenoid valves 523 and 524, and 571 and 572 are opened for the valve control time T under the control of the controller 66. In this case, the compressed air is supplied from the reserve tank 51 to the main and sub air spring chambers 41 and 42 of the front wheel suspension units $S_{FR}$ and $S_{FL}$ through the pipe 53. At the same time, the compressed air is exhausted from the main and sub air spring chambers 41 and 42 of the rear wheel suspension units $S_{RR}$ and $S_{RL}$ through the exhaust pipe 58 and the drier 48. Therefore, even if braking is performed, the front portion of the vehicle body will not be lowered and the rear portion will not be raised.

When position control in step S61 is completed, the flow advances to step S62, and the map memory is updated ($T_M=T_P$). And then the flow returns to step S53 again. If YES in step S57, the flow advances to step S58, where the control time $T_P$ is calculated. In step S59, valve control time T ($=T_P-T_M$) is calculated. If YES in step S60, it is determined that additional position control is necessary. If the deceleration increases after the position control, an additional position control is performed.

If NO in step S57, i.e., when the braking force is temporarily decreased, the flow advances to step S63, control time $T_P$ is calculated in accordance with the acceleration map. In step S64, the difference between the control time $T_M$ stored in step S62 and the control time $T_P$ calculated in step S63 is calculated ($T=T_M-T_P$). If YES (i.e., T>0) in step S65, the flow advances to step S66. The solenoid valves 573 and 574, and 521 and 522 are opened for the valve control time T obtained in step S64 under the control of the controller 66.

In this case, the compressed air is exhausted from the main and sub air spring chambers 41 and 42 of the front wheel suspension units $S_{FR}$ and $S_{FL}$. At the same time, the compressed air is supplied from the reserve tank 51 to the main and sub air spring chambers 41 and 42 of the rear wheel suspension units $S_{RR}$ and $S_{RL}$. A force is applied to the front wheel suspension units $S_{FR}$ and $S_{FL}$ to decrease the vehicle height. However, a force is applied to the rear wheel suspension units $S_{RR}$ and $S_{RL}$ to increase the vehicle height. Thus, the vehicle will not be inclined backward due to the rebound force when braking is stopped.

When position control in step S66 is completed, the flow advances to step S67, and the map memory is updated ($T_M=T_P$), the flow returns to step S53. If NO in step S57, control time $T_P$ is calculated in step S63. In step S64 the difference between the control time $T_M$ stored in step S62 and the control time $T_P$ is obtained ($T=T_M-T_P$). If YES in step S65, it is determined that an additional position control is necessary, the additional position control is performed by the controller 66 in step S66.

If NO in step S54, the controller 66 checks in step S55 whether the control time $T_M$ is equal to 0. This step is necessary to prevent the vehicle body from inclining backward due to the rebound force when braking is abruptly released. If NO in step S55, the flow advances to step S56. In step S56, necessary control is performed during control time $T_M$ for anti nose-dive control in step S62.

As was described in detail, front wheel side air supply and rear wheel air exhaustion are performed for the valve control time given by the acceleration map when braking is performed. However, when braking is released, front wheel air exhaustion and the rear wheel air supply are performed for the valve control time. Therefore, inclination of the vehicle body in the longitudinal direction can be properly controlled, thereby improving driving comfort and safety.

Figure 11A:
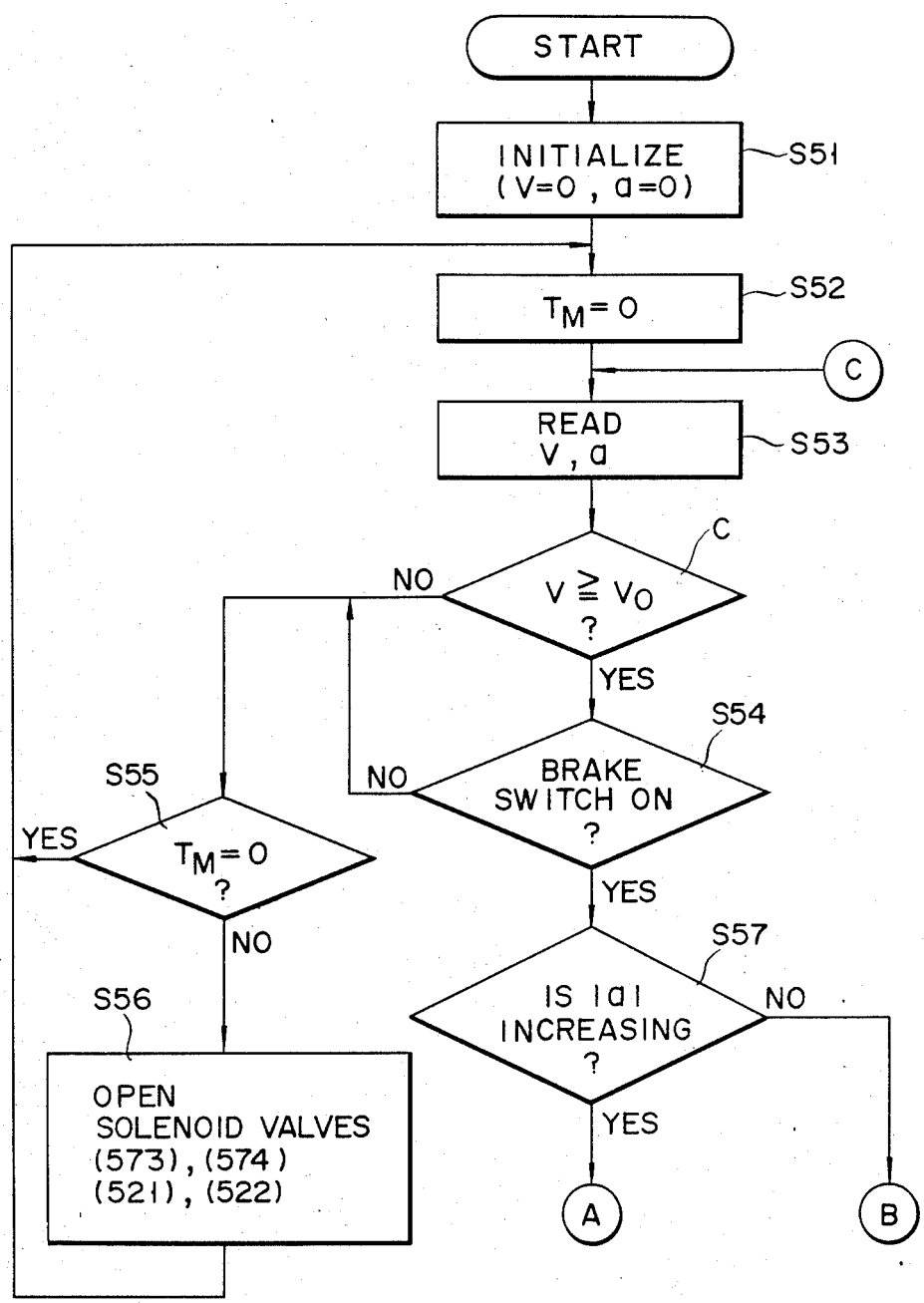
FIGS. 11A to 11C are flow charts for explaining the operation of an eighth embodiment of the present invention.
Figure 11B:
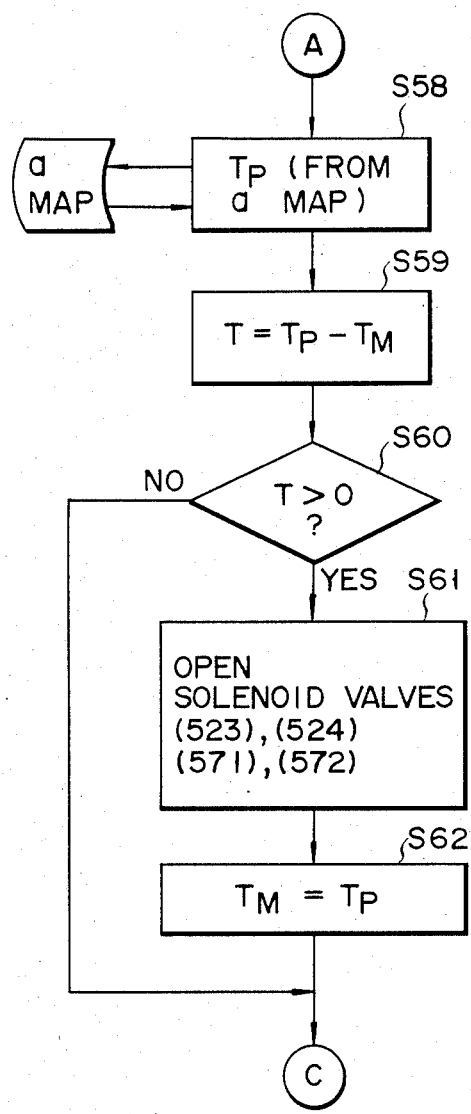
Figure 11C:
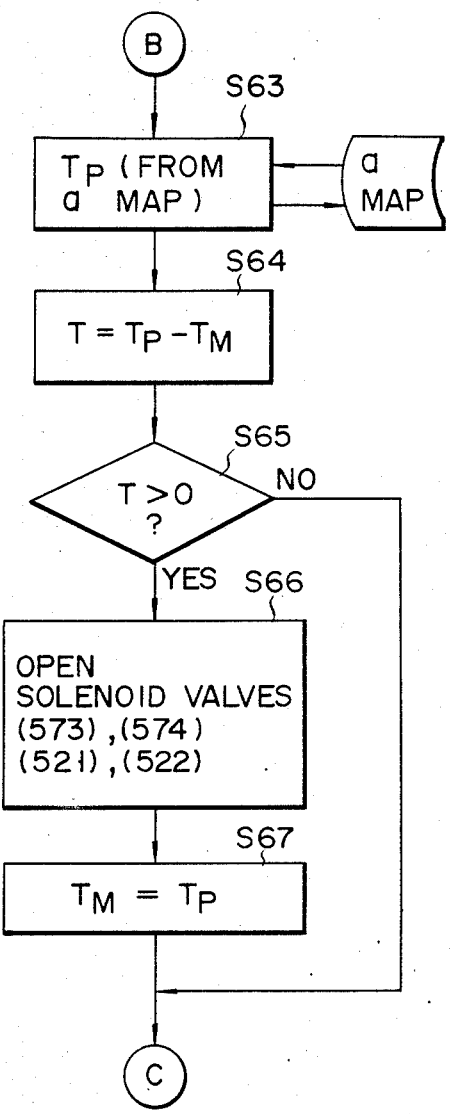

The operation of a eighth embodiment of the present invention will be described with reference to the flow charts of FIGS. 11A and 11B. The flow chart of FIGS. 11A is obtained by inserting step C between steps S53 and S54 of the flow chart of FIG. 10A. In step C, step S54 is executed when the vehicle velocity V exceeds a reference value V0 (e.g., 3 km/h). Therefore, even if the driver depresses the brake pedal to stop on a slope, the anti nose-dive control will not be performed.

In the first embodiment, the front wheel solenoid valves 22a, 22b and the rear wheel solenoid valves 23c, 23d are opened for the same period t to achieve the anti nose-dive control. Alternatively, the valves 22a and 22b may be opened for a period of time, and the valves 23c and 23d may be opened for a different period. In this case, these periods are determined by the balance of the vehicle.

Similarly, in the second to fourth embodiment, the seventh embodiment and the eighth embodiment, the front wheel solenoid valves 523 and 524 may be opened for a period of time, and the rear wheel solenoid valves 571 and 572 may be opened for a different period.

In the first to eighth embodiments, air is used as a working fluid. However, the working fluid may be any safe and controllable fluid.

In the above embodiments, the present invention is applied to a suspension apparatus using an air spring which utilizes air (gas). However, the present invention may also be applied to a hydropneumatic type suspension apparatus using a gas and a liquid.

What is claimed is:

1. A suspension apparatus comprising:
   suspension units mounted on respective wheels and having fluid spring chambers;
   fluid supply means for supplying a fluid to said fluid spring chambers of said suspension units through control valves;
   fluid exhaust means for exhausting the fluid from said fluid spring chambers through exhaust valves;
   acceleration detecting means for detecting acceleration acting on a vehicle body in a longitudinal direction thereof; and
   nose dive preventing means, for preventing a nose dive, in which front wheel fluid supply solenoid valves are opened for a control time T to supply the fluid to corresponding said fluid spring chambers and rear wheel fluid exhaust solenoid valves are opened for the control time T to exhaust the fluid from corresponding said fluid spring chambers when a negative acceleration detected by said acceleration detecting means exceeds a reference negative acceleration.

2. An apparatus according to claim 1, which further comprises velocity detecting means for detecting vehicle velocity, said nose dive preventing means being rendered inoperative when the vehicle velocity detected by said velocity detecting means is smaller than a predetermined velocity.

3. An apparatus according to claim 1, wherein the control time T changes in accordance with the negative acceleration detected by said acceleration detecting means.

4. An apparatus according to claim 1, which further comprises brake detecting means for detecting an operating state of a brake unit, said nose dive preventing means being rendered inoperative when said brake detecting means detects that the brake unit is not operated.

5. An apparatus according to claim 1, which further comprises nose dive cancelling means for exhausting a predetermined amount of fluid from said front wheel fluid spring chambers by opening said front wheel fluid exhaust valves for the control time T when the negative acceleration detected by said acceleration detecting means is smaller than the reference negative acceleration, and for supplying a predetermined amount of fluid from said rear wheel fluid spring chambers by opening said rear wheel fluid supply valves for the control time T, thereby cancelling nose dive in deceleration.

6. An apparatus according to claim 1, which further comprises flow rate control means having large and small diameter fluid paths in each of the paths for supplying the fluid to said fluid spring chambers and exhausting the fluid from said fluid spring chambers, said flow rate control means selecting said large diameter fluid path when nose dive control is performed by said nose dive preventing means and said small diameter fluid path when nose dive cancelling is performed by said nose dive cancelling means.

7. An apparatus according to claim 1, wherein said front wheel fluid supply solenoid valves are opened for a period of time, and said rear wheel fluid exhaust solenoid valves are opened for a different period of time.

8. A suspension apparatus comprising:
   suspension units mounted on respective wheels and having fluid spring chambers;
   fluid supply means for supplying a fluid to said fluid spring chambers of said suspension units through control valves;
   fluid exhaust means for exhausting the fluid from said fluid spring chambers through exhaust valves;
   acceleration detecting means for detecting an acceleration acting on a vehicle body along a longitudinal direction thereof; and
   nose dive preventing means, for preventing a nose dive, in which front wheel fluid supply solenoid valves are opened for a control time T to supply the fluid to corresponding said fluid spring chambers when a negative acceleration detected by said acceleration detecting means exceeds a reference negative acceleration.

9. A hydropneumatic type suspension apparatus comprising:
   suspension units mounted on respective wheels and having fluid spring chambers;
   fluid supply means for supplying a fluid to said fluid spring chambers of said suspension units through control valves;
   fluid exhaust means for exhausting the fluid from said fluid spring chambers through exhaust valves;
   acceleration detecting means for detecting acceleration acting on a vehicle body in a longitudinal direction thereof, and
   nose dive preventing means, for preventing a nose dive, in which front wheel fluid supply solenoid valves are opened for a control time T to supply the fluid to corresponding said fluid spring chambers and rear wheel fluid exhaust solenoid valves are opened for the control time T to exhaust the fluid from corresponding said fluid spring chambers when a negative acceleration detected by said acceleration detecting means exceeds a reference negative acceleration.

10. A suspension apparatus comprising:

suspension units mounted on respective wheels and having air spring chambers;

air supply means for supplying air to said air spring chambers of said suspension units through control valves;

air exhaust means for exhausting the air from said air spring chambers through exhaust valves;

acceleration detecting means for detecting acceleration acting on a vehicle body in a longitudinal direction thereof; and nose dive preventing means, for preventing a nose dive, in which front wheel air supply solenoid valves are opened for a control time T to supply the air to corresponding said air spring chambers and rear wheel air exhaust solenoid valves are opened for the control time T to exhaust the air from corresponding said air spring chambers when a negative acceleration detected by said acceleration detecting means exceeds a reference negative acceleration.

* * * * *